April 28, 1925.  1,535,255
C. E. RYAN
AUXILIARY DRIVING ATTACHMENT FOR AUTOMOBILES
Filed Jan. 9, 1924  2 Sheets-Sheet 1
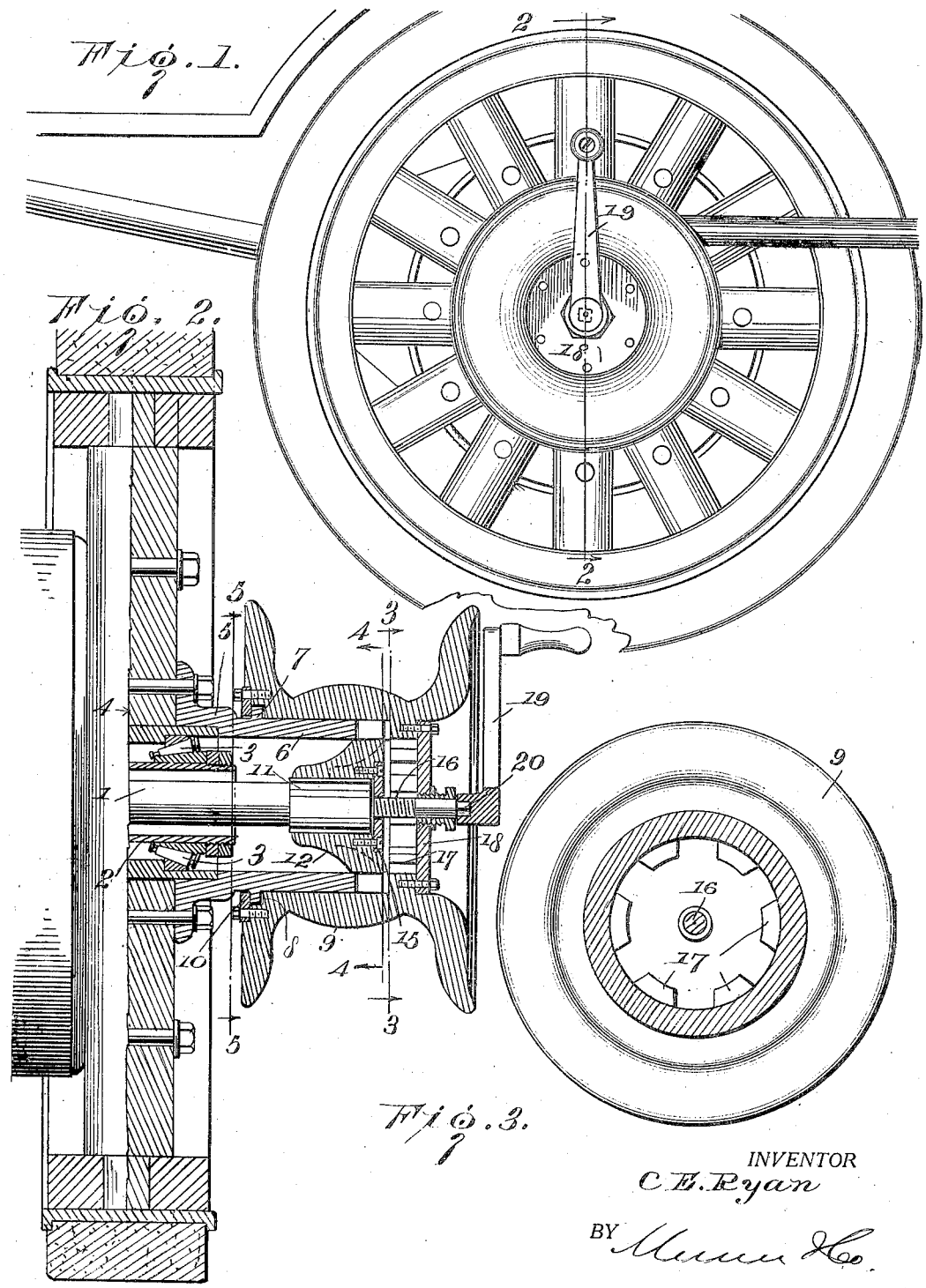
INVENTOR
C. E. Ryan
BY
ATTORNEYS April 28, 1925.  
C. E. RYAN  
1,535,255  
AUXILIARY DRIVING ATTACHMENT FOR AUTOMOBILES  
Filed Jan. 9, 1924   2 Sheets-Sheet 2
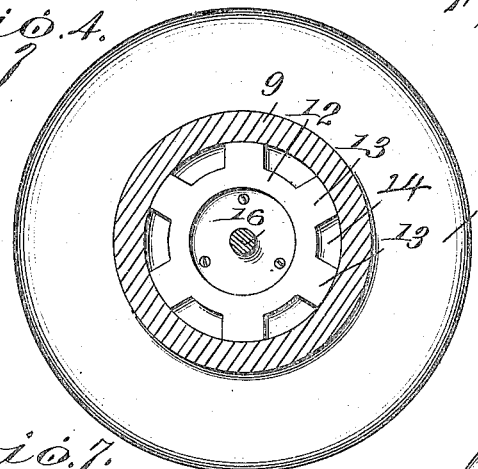
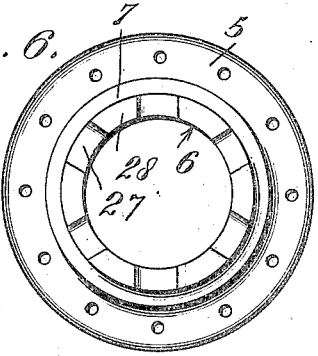
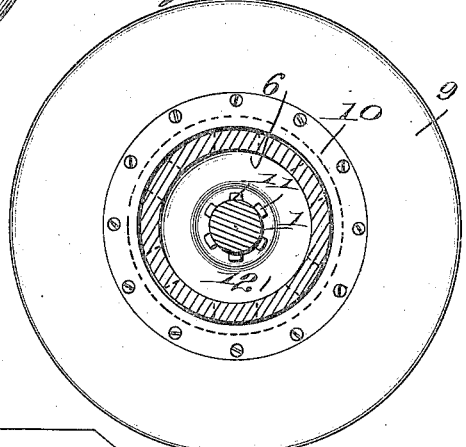
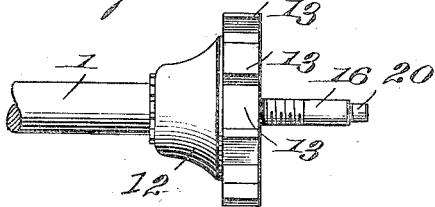
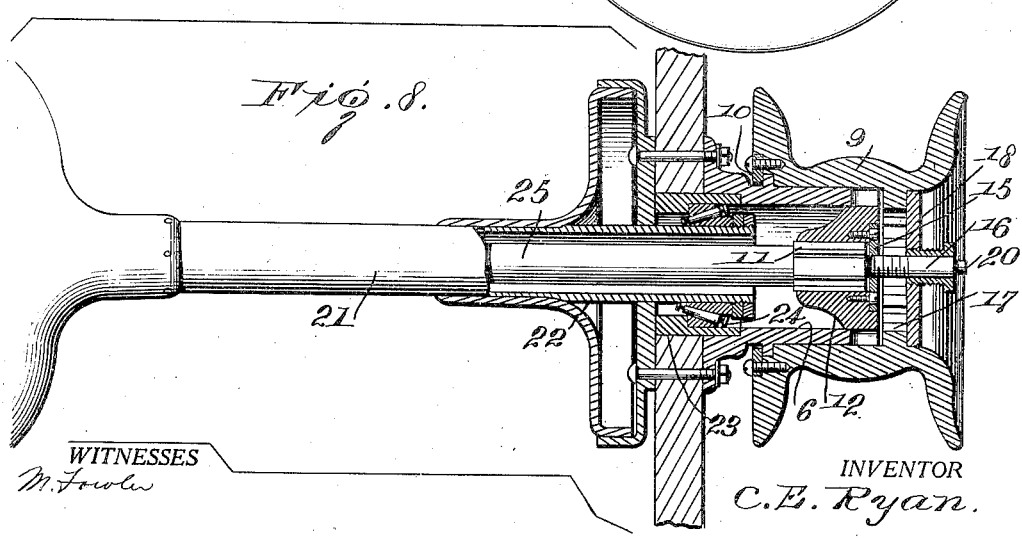
INVENTOR  
C. E. Ryan.  
BY  
ATTORNEYS Patented Apr. 28, 1925.

1,535,255

UNITED STATES PATENT OFFICE.

CHARLES EDWARD RYAN, OF ARDMORE, OKLAHOMA.

AUXILIARY DRIVING ATTACHMENT FOR AUTOMOBILES.

Application filed January 9, 1924. Serial No. 685,170.

*To all whom it may concern:*

Be it known that I, CHARLES EDWARD RYAN, a citizen of the United States and a resident of Ardmore, in the county of Carter and State of Oklahoma, have invented certain new and useful Improvements in Auxiliary Driving Attachments for Automobiles, of which the following is a specification.

This invention relates to driving means adapted to be connected to automobiles and has for its object the provision of a device which may be readily connected to the axle of an automobile and be driven by said axle whereby it is possible to operate machines from the driving means connected with the axle without necessitating the jacking of the rear end of the automobile.

A further object of the invention is the provision of a driving pulley which is adapted to be readily connected to the driving axle of an automobile and in which the pulley may be readily disengaged from the driving axle without removing the pulley, the pulley being adapted for use in driving various kinds of machines.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view of a rear wheel of an automobile showing my invention applied thereto.

Figure 2 is a sectional view of the hub and driving pulley and taken along the line 2—2 of Figure 1.

Figure 3 is a transverse vertical section through the driving pulley and taken along the line 3—3 of Figure 2.

Figure 4 is a transverse vertical section of the driving drum taken along the line 4—4 of Figure 2.

Figure 5 is a transverse vertical section taken along the line 5—5 of Figure 2.

Figure 6 is an end view of the sleeve with the pulley removed.

Figure 7 is an enlarged detail view of the means for connecting the shaft to the driving pulley.

Figure 8 is a longitudinal section of a rear axle showing the application of my invention to the well-known Ford construction.

Referring more particularly to the drawings, 1 designates a floating axle of an automobile which is embraced by an axle housing 2 which in this case carries the weight of the machine since the hub of the wheel is carried directly by said housing. The usual roller bearings 3 are held in place on the housing 2 and within the hub 4 of the wheel. The usual hub flange 5 is bolted in position on the hub but in this instance I prefer to employ a hub flange having an integrally formed sleeve 6 projecting outwardly and embracing the outer extension of the shaft 1.

The sleeve 6 is provided with an annular rib 7 which is adapted to be seated within a recess 8 formed on the inner end of a pulley or drum 9. The bore of the drum is of such an extent as to receive the sleeve 6 so that the rib 7 will fit within the groove 8 and be locked within said groove by means of a ring 10 secured in place by means of set screws threaded into passages within the inner end of the drum 9. By this construction the drum is maintained on the sleeve 6 while permitting the drum to rotate thereon.

The outer end of the shaft 1 is provided with a plurality of splines 11 adapted to be received within cooperating grooves on the interior of the hollow connecting member 12. The connecting member is slidable on the shaft but is rotated at all times when the shaft 1 is rotated. The outer end of the connecting member 12 is enlarged into an annular flange. This flange is cut at intervals to form radially projecting lugs 13 which are adapted to be engaged by lugs 17 formed in the base of the pulley 9, lugs 17 being seated in notches 14 between the lugs 13. Upon the outer end of the connecting member 12 is formed a recess in which is adapted to be seated a disc 15 and locked to the rotatable member by means of set screws. The center of the said disc is provided with a threaded perforation into which is screwed the inner end of a screw 16.

The lugs 17 are formed integrally with the wall of the bore of the drum 9 adjacent the outer end of the drum and to the outer periphery of which is secured a disc 18. The disc is provided with a centrally disposed threaded passage which receives the threaded portion of a gland 16ª. A smooth portion of the screw is rotatable in the gland 16ª. The outer end of the screw is provided with a polygonally faced portion 20 adapted to be engaged by a crank for rotating the screw. In place of the crank 19 any form of tool may be employed which is capable of engaging the polygonally faced portion of the screw whereby the screw may be rotated.

The operation of the device shown in Figures 1 and 2 is as follows:

The pulley 9 normally remains in an inoperative position during the ordinary running of the automobile. The pulley is placed in an operative position by the screw 16. Rotation of the screw which abuts the outer end of the shaft 1, engages the threads of the central passage of the disc 15 causing said disc to be drawn outwardly as the screw is moved inwardly through the threaded perforation in the disc 15. The outward movement of the disc 15 causes an outward movement of the connecting member 12 whereby the lugs 13 on the connecting member will be moved into engagement with the lugs 17 on the pulley 9 so that the connecting member will lock the ring and likewise the pulley 9 to the shaft 1. Since the connecting member 12 is always rotated by the shaft 1 because of the splined connection between said connecting member and the shaft, the pulley will be rotated as soon as the connecting member 12 is moved into engaging relation with the lugs 17.

The pulley 9 is disconnected from the driving shaft 1 by rotating the screw 16 in the opposite direction to that just described so that the connecting member 12 will be moved inwardly forcing the lugs 13 on said connecting member out of engagement with the lugs 17 on the pulley. In this position of the connecting member the automobile or tractor may be driven without causing rotation of the pulley. As has been stated it is not necessary to jack up the rear wheels in order to drive the pulley when desired.

Certain changes are required in the construction of the rear of a Ford automobile when it is desired to apply my device to the same. This is due to the fact that the Ford rear axle is a semi-floating axle instead of a floating and the only changes necessitated are those which will convert the usual Ford rear axle into a floating one. I therefore remove the usual roller bearings from the outer ends of the rear axle housing 21 and insert therein a short auxiliary housing 22. The inner end of this housing conforms to the inner end of the usual Ford housing and is secured in any approved manner to the same.

The hub 23 of the Ford rear wheel is bored sufficiently to receive the auxiliary housing 22 and a roller bearing 24 so that the wheel is carried entirely by the auxiliary housing 22 and the weight is removed from the rear axle 25. The pulley 9 and the other parts for connecting the pulley to the rear axle 25 and the means for supporting the pulley are identical in construction with the structure set forth in Figures 1 and 2 and therefore a description of Figures 1 and 2 suffices for a description of the construction shown in Figure 8.

The outer end of the sleeve 6 is provided with a plurality of lugs 27 and notches 28 adapted to be engaged respectively by the complementary notches and lugs on the slidable collar 12 whereby the hub and likewise the wheel is driven by the rear axle of the motor driven vehicle and whereby said vehicle is propelled since the sleeve 6 is rigidly connected to the wheel.

It will be seen that inward movement of the collar 12 locks the axle to the wheel, while outward movement of the collar locks the pulley to the axle.

While I have shown dog clutches which includes lugs and cooperating notches for locking the pulley to the axle and for locking the hub of the wheel to the axle, any well known form of clutching means may be employed for the purpose.

What I claim is:

1. In a motor driven vehicle, the combination of a rear axle, a housing embracing the axle, a wheel supported by the housing, a sleeve embracing the axle and rigidly connected with the wheel, a pulley rotatably mounted on the sleeve, means adapted to connect the pulley to the rear axle for causing rotation of the pulley on the sleeve, and means for releasing the connecting means between the pulley from the axle.

2. In a motor driven vehicle, the combination of a rear axle, a housing embracing the axle, a wheel supported by the housing, a sleeve embracing the axle and rigidly connected with the wheel, a pulley rotatably mounted on the sleeve, means driven by the axle and slidable on said axle for operatively connecting the pulley to the axle.

3. In a motor driven vehicle, the combination of a rear axle, a housing embracing the axle, a wheel supported by the housing, a sleeve embracing the axle and rigidly connected with the wheel, a pulley rotatably mounted on the sleeve, means driven by the axle and slidable on said axle for operatively connecting the pulley to the axle, and means for actuating the slidable means for disconnecting or connecting the pulley to the rear axle.

4. In a motor driven vehicle, the combination of a rear axle, a housing embracing the axle, a wheel supported by the housing, a sleeve embracing the axle and rigidly connected with the wheel, a pulley rotatably mounted on the sleeve, means driven by and slidable on the axle, means on the pulley adapted to engage the slidable means on the axle for locking the pulley in operative relation with the axle.

5. In a motor driven vehicle, the combination of a rear axle, a housing embracing the axle, a wheel supported by the housing, a sleeve embracing the axle and rigidly connected with the wheel, a pulley rotatably mounted on the sleeve, means driven by and slidable on the axle, means on the pulley adapted to engage the slidable means on the axle for locking the pulley in operative relation with the axle, and cooperating means between the pulley and the slidable means for causing movement of the slidable means on the axle for disconnecting or connecting the pulley with the axle.

6. In a motor driven vehicle, the combination of a rear axle, a housing embracing the axle, a wheel supported by the housing, a sleeve embracing the axle and rigidly connected with the wheel, a pulley rotatably mounted on the sleeve, a collar slidably mounted on the axle, driven by said axle and provided with lugs, lugs on the pulley cooperating with the lugs on the collar for locking the pulley to the axle, and means for sliding the collars for causing the lugs on the collar to engage or become disengaged from the lugs on the pulley.

7. In a motor driven vehicle, the combination of a rear axle, a housing embracing the axle, a wheel supported by the housing, a sleeve embracing the axle and rigidly connected with the wheel, a pulley rotatably mounted on the sleeve, a collar slidably mounted on the axle, driven by said axle and provided with lugs, the pulley having lugs projecting toward the lugs on the collar adapted to engage the last mentioned lugs and lock the pulley to the axle whereby the pulley is revolved with the rotation of the axle.

8. In a motor driven vehicle, the combination of a rear axle, a housing embracing the axle, a wheel supported by the housing, a sleeve embracing the axle and rigidly connected with the wheel, a pulley rotatably mounted on the sleeve, means adapted to connect the pulley to the rear axle for causing rotation of the pulley on the sleeve, means for releasing the connecting means between the pulley from the axle, and means on the sleeve adapted to be engaged by the connecting means between the pulley and the axle for locking the wheel to said axle.

9. In a motor driven vehicle, the combination of a rear axle, a housing embracing the axle, a wheel supported by the housing, a sleeve embracing the axle and rigidly connected with the wheel, a pulley rotatably mounted on the sleeve, means driven by the axle slidable on said axle for operatively connecting the pulley to the axle, and means on the sleeve adapted to be engaged by the slidable means for locking the wheel to the axle.

10. In a motor driven vehicle, the combination of a rear axle, a housing embracing the axle, a wheel supported by the housing, a sleeve embracing the axle and rigidly connected with the wheel, a pulley rotatably mounted on the sleeve, means driven by the axle and slidable on said axle for operatively connecting the pulley to the axle, means on the sleeve adapted to be engaged by the slidable means for locking the wheel to the axle, and means for moving the slidable means for causing the slidable means to connect the pulley with the axle and for moving the slidable means in the opposite direction to connect the wheel with the axle.

11. In a motor driven vehicle, the combination of a rear axle, a housing embracing the axle, a wheel supported by the housing, a sleeve embracing the axle and rigidly connected with the wheel, a pulley rotatably mounted on the sleeve, a collar slidably mounted on the axle, driven by said axle and provided with lugs, the pulley having lugs projecting toward the lugs on the collar adapted to engage the last mentioned lugs and lock the pulley to the axle whereby the pulley is revolved with the rotation of the axle, the end of the sleeve being provided with lugs adapted to be engaged by the lugs on the collar when said last mentioned lugs have been disengaged from the lugs on the pulley whereby the axle is locked to the wheel.

CHARLES EDWARD RYAN.